United States Patent Office 3,402,022
Patented Sept. 17, 1968

3,402,022
METHOD FOR PRODUCING HYDROGEN AND
A CATALYST THEREFOR
John C. Hayes, Palatine, Ill., assignor to Universal Oil
Products Company, Des Plaines, Ill., a corporation of
Delaware
No Drawing. Filed Jan. 4, 1965, Ser. No. 423,319
8 Claims. (Cl. 23—212)

ABSTRACT OF THE DISCLOSURE

Production of hydrogen by decomposition of gaseous hydrocarbons in contact with fluidized nickel-alumina catalyst containing barium or lithium to provide continued high catalyst activity and to reduce clinker formation.

---

The present invention is directed to an improved stable operation for the fluidized production of hydrogen and to a method for providing an improved finely divided catalyst suitable for effecting the fluidized decomposition of a gaseous hydrocarbon stream. More specifically, there is provided an alumina-nickel catalyst with one or more components from the alkaline earth and alkali metal groups of elements, as for example barium oxide and lithium oxide, which attain improved stability and high activity for use in a fluidized hydrogen producing system.

Light hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen have generally been effected at high temperature decomposition conditions in the presence of supported iron group metals and, at the present time, it has been determined that a catalyst consisting of alumina, which is comparatively neutral, and a metal of Group VIII, and in particular, nickel of the iron group of metals, exhibits considerably greater activity with respect to the decomposition of normally gaseous hydrocarbons to hydrogen than does a catalyst consisting of silica-alumina and nickel. In other words, the comparatively neutral alumina unexpectedly imparts a higher degree of activity to the catalyst than does the acid-acting high silica content silica-alumina catalyst, and this is so despite the recognized superiority of silica-alumina as gas-oil cracking catalysts.

In carrying out a continuous hydrogen producing operation on a commercial scale, it is advantageous to utilize a fluidized or moving bed system to effect an efficient contacting of the particles with the hydrocarbon stream. Thus, it is of benefit to have a catalyst which can be alternatively contacted with a charge stream in a reaction zone and then contacted with an air stream in a regeneration zone over a period of time without rapid deactivation. In test operations involving the use of certain of the alkaline earth metal components in combination with an alumina-nickel catalyst, it appears that the addition of low percentages of barium oxide has a definite effect upon improving the stability or prolonged activity of the catalyst in a fluidized operation.

Also, in connection with a system for the fluidized catalytic decomposition of a hydrocarbon stream to produce hydrogen, using the preferred catalyst of finely divided alumina-nickel particles, there has been found a problem of clinker formation in the system, with such clinkers gathering at the valves or other critical points to block flow. These clinkers appear to contain a high percentage of free nickel which is disassociated from the nickel in the catalyst composite. Further, it has been found that modifications in composition and/or preparation of the catalyst have a direct relationship on the extent of nickel migration and clinker formation in the system. In particular, it has been found that certain alkaline earth and/or alkali metal components are effective in reducing clinker formation, as well as aiding in the catalyst stability.

It is, therefore, a principal object of the present invention to provide an improved fluidized method for producing hydrogen through the use of a specially prepared finely divided catalyst of alumina-nickel and an additive of a small quantity of an alkaline earth and/or alkali metal element so as to maintain activity of the catalyst and a substantial reduction or elimination of clinker formation in the system.

Broadly, the present invention embodies a process for the fluidized production of hydrogen from the catalytic decomposition of a gaseous hydrogen stream in a manner which comprises contacting the hydrocarbon stream at decomposition conditions with subdivided catalyst particles, consisting predominantly of alumina as a base, nickel as an active component and an additive component selected from the group consisting of alkaline earth metals, alkali metals and mixtures thereof.

In another embodiment, the present invention provides an improved hydrocarbon decomposition catalyst comprising alumina-nickel and an additive of a small quantity of barium-oxide and/or lithium oxide, where the finely divided particles of such catalyst are prepared by mixing with an aluminum hydrogel slurry a catalytic amount of a nickel compound and a stabilizing amount of the additive component of barium oxide and/or lithium oxide, spray drying the mixture to provide the resulting finely divided formed particles and then calcining them at an elevated temperature in the presence of air.

As used herein the term "stabilizing amount" will generally mean a small percentage of about 1% to 15% by weight of the resulting catalyst composite, with such amount having the ability to measurably increase the active life and usefulness of the catalyst particles in a fluidized hydrogen producing system or for increasing conversion and hydrogen production and/or decreasing the amount of nickel-containing clinker formation in the system by reason of nickel migration from the catalyst particles.

As indicated hereinbefore, a high alumina content base or an all-alumina base for the catalyst is preferred to silica-alumina or other typical catalyst support materials. Prior associated work has shown that the over-all activity is best with the high alumina content, with such activity being in part the result of an independent effect exerted by the alumina oxide or by reason of a particular effect of the alumina with the nickel as the preferred active component. Alumina as a catalyst support may be synthetically prepared or may be of a naturally occurring alumina, such as recovered from bauxite. Synthetically prepared alumina may be of the gel type generally prepared by precipitation methods; for example, an alkaline reagent such as ammonium hydroxide, ammonium carbonate, etc., is commingled with an acidic solution of an aluminum salt which may be an aqueous solution of aluminum chloride, aluminum sulfate, aluminum nitrate and the like, to precipitate the desired alumina. Alternatively, alumina may be precipitated by commingling hydrochloric acid, sulfuric acid, nitric acid or the like, with an alkaline solution of a suitable aluminum salt such as sodium aluminate, potassium aluminate, etc.

The hydrogel providing the preferred controlled resulting catalyst for the present hydrogen producing system shall have a regulated relatively low chloride ion content providing generally not more than about .05 to 3.0 percent by weight of the base material in the finished fresh catalyst after calcination. Thus, preferably the hydrogel prepared by precipitation from aluminum chloride solution shall be washed and filtered several times to reduce the chloride concentration to the desired level consistent with attrition resistance aspects. It is recognized that some chloride content appears to slow down crystallite formation in the alumina structure and affect greater attrition resistance in the finished catalyst.

Where alumina is desired in a microspherical form for use in a fluidized operation, as for example in the present fluidized hydrogen producing system, the gel may be processed through a spray drier or spinning disc operation which will form microspheres or macrospheres of a desired size. After the microsphere formation, regardless of the source or method of preparation, the dried alumina support material is subjected to calcination at a temperature of at least 900° F. and generally at a temperature above 1000° F. to 2000° F. to yield a substantially anhydrous alumina. The preferred calcination temperatures are moderately high, being in the range of from 1200° F. to about 1600° F., although higher temperatures appear to have no detrimental effect and sometimes a beneficial effect. The calcination may be carried out in any suitable atmosphere, usually being in the presence of air or other oxidizing media; although, in some cases, it may be in the presence of a nitrogen or other inert atmosphere. The time of calcination will vary with the temperature but generally the time will be from about 0.5 to 10 hours and preferably of the order of 2 to 4 hours.

The nickel content of the improved catalyst of this invention may be obtained by impregnating the alumina or alumina-nickel support with a suitable aqueous solution of the nickel salt, such as, for example, nickel nitrate, nickel formate or an acid salt such as nickel chloride and nickel sulfate with an ammoniacal solution which will convert the salt to the metal oxide, followed by heating to drive off the volatile components. There may be successive soakings of the support into the impregnating solution or there may be a continuous soaking for a period of one or more hours until the particular type of support acquires the desired amount of the active metal component which be retained after rinsing and drying of the composite.

However, associated work has shown that good activity and improved attrition resistance is obtained by the procedure of adding the nickel salt to the slurry feed of alumina hydrogel such that the catalyst particles are comminuted or spray dried from an alumina hydrogel slurry containing the nickel salt. For example, a nickel nitrate solution is incorporated into the alumina or alumina-nickel hydrogel slurry stream which will generally provide from about 5% to 20% nickel by weight of the finished calcined catalyst particles. For some reason, with the nickel added to the slurry ahead of the spray drier, there is better attrition resistance to the finished catalyst than when the particles are impregnated by soaking in a nickel solution. It is, however, not intended to limit the present invention to the use of any one solution or salt for commingling with the hydrogel slurry which is to be comminuted by the spray drier or the comminuting means, nor for use as any one impregnating solution or finely divided particles are soaked to obtain the desired impregnation of nickel content.

As indicated briefly hereinabove, in order to control acidity of the finished catalyst base and/or composite to resist clinker formation in a fluidized system, it is desirable to have controlled washing of the alumina precipitate or flock prior to the formation of alumina into an aqueous slurry with the commingled solution of activating metal salt which is comminuted into the desired finely divided particles. Prior washing operations have generally been carried out in multiple stages to insure the substantially complete removal of acid ions, as for example the chloride or nitrate ions which are in the alumina floc at the time of precipitating amorphous alumina from an aluminum chloride or an aluminum nitrate salt solution. A substantially complete removal of the ions has been found to cause relatively rapid crystal growth within the alumina such that boehmite state is attained in a short period of time by aging or by heating. Conversely, the improved operation for providing attrition resistance effects a controlled washing where residual acid ions, depending upon the salt from which the material is prepared, remain in combination with the alumina at the time of preparing a slurry feed for spray drying. The amount of acid ion may vary from about 0.20% to about 0.30% as $Cl^-$ in the hydrogel, depending upon the time involved between the formation of the alumina precipitate and the initiation of the actual comminuting operation, as well as upon the time involved prior to the addition of the nickel salt or other iron group metal salts. In other words, where the manufacturing steps are carried out in a sequential manner leading to the spray drying operation within but a matter of a few hours after the alumina floc formation and washing steps and the addition of the activating metal salt, then there may be a relatively low percentage of acid ion left in the slurry as it is fed to the spray drying equipment. However, on the other hand, where the time period between alumina precipitation step and the metal salt commingling step and the spray drying step is lengthened and becomes greater than about 10 or 12 hours, then the acid ion content is preferably in the range of about 0.30% $Cl^-$ of the amorphous alumina precipitate at the time of preparing such precipitate as an aqueous slurry for the salt commingling and comminution steps.

Another advantageous procedure for controlling crystallite growth in the amorphous alumina precipitate resides in the regulation of temperature during the washing steps as well as during the precipitation of the alumina floc from the aluminum salt by the ammonium hydroxide solution. In other words, the precipitation step may be carried out at a temperature below the normal room temperature and down to the order of about 40° F., so as to reduce the tendency for crystal growth in the alumina hydrogel. Subsequently, instead of effecting the usual six or seven washing stages, for the purification and elimination of acid ions from the precipitate, that are carried out at slightly elevated temperatures, there may be a stirring and washing of the precipitate in each of the successive washing stages at a temperature equivalent to about room temperature or at a lower temperature, down to the order of approximately 40° F., to likewise reduce the tendency for crystallite growth in the alumina hydrogel.

The improved processing system and alumina-nickel catalyst with the additive component for stabilization may be formed by utilizing the aforementioned methods of impregnation or of adding the component to the slurry stream ahead of the comminution step. In other words, the alkaline earth metal component or the alkali metal component may be incorporated as a salt solution directly with the alumina hydrogel slurry stream going to the spray drier or spinning disc equipment such that the particles contain the nickel and active stabilizing component. On the other hand, the additive component may be incorporated into the catalyst composite by the use of an impregnating solution containing the additive salt such that after one or more hours of soaking the finely divided alumina particles, there will be a finished dried composite of 2% to 15% quantity of stabilizing amount of the desired additive component(s). For example, where it is desired to have barium oxide in the finished catalyst, there may be an incorporation of a stabilizing amount of barium hydroxide added to the alumina hydrogel slurry stream along with a nickel salt such as nickel nitrate to give the desired improved finished composite. In other instances, there may be the incorporation of lithium hydroxide with the alumina-nickel component slurry stream carrying to the spray drying equipment such that the desired finished catalyst composite contains the predetermined stabilizing quantity of lithium oxide in the improved catalyst. However, it is not intended to limit the present invention to any one means for impregnating or incorporating the desired stabilizing amount of additive component to the finished catalyst. Although, in any event, it is preferred that the nickel component be added to the slurry stream prior to the comminution step in order that improved attrition results are obtained in forming finely divided microspheres of catalyst particles that are used in a fluidized hydrogen producing system.

The following examples are presented to illustrate in a comparative manner the improved results obtainable from utilizing an improved alumina-nickel additive component catalyst in effecting the fluidized production of hydrogen in a confined system such that there is greater activity, better stability and reduced clinker formation.

All of the tests set forth in the following examples utilized a small quartz reactor, sized approximately 2 inches in diameter by 8 inches in length, whereby approximately 40 cc. of microspherical catalyst particles may be used to contact a methane charge stream in a fluidized manner. The methane was introduced into the reactor at a gaseous hourly space velocity of about 6150 to effect contacting of the catalyst at about 1600° F. for a period of 12 seconds. In a continuous cyclic operation, the catalyst particles were subjected to a nitrogen purge stream after the conversion for approximately 12 seconds and then subjected to oxidation by an air stream for approximately a 25 to 28 second period of time so as to effect substantial removal of carbon from the catalyst particles. All of the test procedures were carried out continuously for at least a 32 hour period of time, although in some instances, certain of the catalysts were tested for an additional four hours to provide a total of 36 hours. A Fisher Gas Chromatograph and a Liston-Becker Infrared analyzer were used to analyze the effluent products and to determine methane conversion as a measure of catalyst activity.

EXAMPLE 1

An alumina-nickel catalyst for this test operation was prepared by obtaining alumina hydrogel by precipitation thereof from aluminum chloride with ammonium hydroxide in an aqueous mixture where the final pH was about 8.0. The hydrogel was water washed and filtered to reduce the chloride concentration to the level of about 0.70% chloride content in the finished catalyst. The filter-cake was reslurried and nickel nitrate added to the slurry in an amount to provide approximately 7% nickel in the finished catalyst, after spray drying and calcining. The slurry in this instance was sprayed into finely divided microspherical particles by the use of a 5 foot diameter pilot plant sized spray drier. The latter utilizes approximately 1000° F. heated air which is introduced concurrently with the charge. The air leaves the drier at about 300° to 350° F. such that heat absorbed by the particles is dissipated in the evaporation of entrained water content. The collected spray dried particles were calcined for about 2 hours at about 1350° F. in the presence of air. In order to simulate the aging of the catalyst and to accelerate the stability testing procedure and possible high temperature deactivation, the particles were subsequently recalcined for about 3 hours at 2200° F.

The thus prepared catalyst was tested in the quartz reactor in the manner heretofore described. As a measure of activity, the catalyst provided a methane conversion of 80.7% at the end of 32 hours of operation following the repetitive four stage cycle of (1) methane charge for 12 seconds, (2) nitrogen purge for 12 seconds, (3) air regeneration for from 25 to 28 seconds, and (4) nitrogen purge for 12 seconds.

A separation and weighing of clinker formation in the test unit provided 182.6 milligrams of a high nickel content clinker. A portion of catalyst tested in the reactor unit which had only the first 1350° F. calcination (i.e., not having the 3 hour 2200° F. oxidation) provided the formation of some 290 milligrams of clinker.

EXAMPLE II

The catalyst of this example was prepared in a manner similar to that described for Example I, except that barium hydroxide was added to the slurry feed prepared for the spray drier in an amount to provide approximately 2% barium oxide in the finished alumina-nickel catalyst.

After 32 hours of the activity testing procedure, there was found to be a methane conversion of 79.4%. Clinker formation was not measurable with a sample of catalyst which had been subjected to only the first 1350° F. calcination and no test was run with catalyst that had been subjected to the 2200° F. recalcination.

EXAMPLE III

The catalyst of this example was also prepared in a manner similar to that described for Example I, with 2200° F. oxidation used to accelerate possible high temperature deactivation, except that barium hydroxide was added to the slurry feed prepared for the spray drier in an amount to provide approximately 5% barium oxide in the finished alumina-nickel-barium oxide catalyst.

After 32 hours of the activity testing procedure, there was found to be a methane conversion of 90.3% and at the end of further four hour period, providing a total of 36 hours of testing, there was a conversion of 85.8%. No clinker formation was found with a sample of the catalyst which had been subjected to only the first 1350° F. calcination, nor was there any clinker formation found in connection with the catalyst sample which had been subjected to the 2200° F. recalcination preparation procedure.

EXAMPLE IV

The catalyst for this test was prepared by obtaining microspherical alumina particles as a base in accordance with the spray drying technique set forth in Example I, except that the nickel salt was not added to the slurry feed stream. In this case, both the activating and additive components are incorporated by soaking or impregnation of the spray dried microspheres. A nickel nitrate solution along with the barium hydroxide was utilized to impregnate the alumina microspheres in amounts providing a dried and calcined composite with about 7% nickel and about 5% barium oxide, by weight of the finished composite. Again, the impregnated particles were subjected to a first stage calcination for about two hours at 1350° F. in the presence of air and to a subsequent oxidation or recalcination treatment for about 3 hours at 2200° F. as an accelerated aging procedure.

After 32 hours of the activity test procedure, there was found to be a methane conversion of 92.6% while at the end of a 36 hour period there was a methane conversion of 84.9%. In testing for clinker formation, there was found to be less than 10 milligrams of clinker in the reactor for catalyst particles subjected to the first stage 1350° F. calcination; while with catalyst particles subjected to the recalcination procedure, there was found to be less than 1 milligram in the test reactor.

EXAMPLE V

The catalyst of this example was prepared in a manner similar to that described in Examples I, II and III, where the additive components were incorporated into the slurry feed passing to the spray drier, except that for this test there was sufficient barium hydroxide utilized to provide a resulting 10% barium oxide in the dried and calcined composite.

At the end of a 32 hour test period there was found to be a methane conversion of 87.6%, while at the end of a 36 hour period there was a conversion of 84.5%. With respect to clinker formation, a sample of catalyst subjected to only the 1350° F. calcination resulted in 32.0 milligrams of clinker in the test reactor. In connection with the catalyst sample subjected to the recalcination step at 2200° F., there was found to be 16.9 milligrams of clinker formation.

EXAMPLE VI

The catalyst for this test was prepared in a manner similar to that set forth in Example I; however, in this instance, lithium hydroxide was added to the slurry feed to the spray drier along with nickel nitrate solution in an amount such that the dried calcined composite contained approximately 7% nickel and 1½% lithium oxide.

After a 32 hour period of activity testing there was found a methane conversion of 88.4%, while at the end of a 36 hour period of testing, there was a methane conversion of 85.8%. In connection with clinker formation, a catalyst of this type was subjected to only the first stage 1350° F. calcination testing for clinker formation and there were found 19.0 milligrams of clinker in the reactor at the end of the test period.

EXAMPLE VII

The catalyst of this example was prepared in a manner similar to that set forth in Examples I and VI, except that in this instance, lithium hydroxide was added to the slurry feed in an amount to provide approximately 3% lithium oxide in the alumina-nickel-lithium oxide composite.

At the end of a 32 hour period of activity testing, there was found a methane conversion of 80.8%. For a catalyst which had been subjected to the first stage 1350° F., calcination procedure, there was found 42.7 milligrams of clinker, while in connection with a sample subjected to recalcination at 2200° F., there was no measurable amount of clinker formation found in the system.

For convenience, the described catalysts and test results in connection therewith are recapitulated in the accompanying Table I. It may be noted, by way of comparison, that all of the catalysts having the activity stabilizing additive component of barium or lithium oxide have the effect of substantially reducing clinker formation in the test system. At the same time, it should be noted that even in view of subjecting the catalysts to a high temperature of 2200° F., the additive components appear to have a beneficial stabilizing effect upon the conversion activity such that there was a continued high activity for the 32 hour test periods, and in some instances, for a greater period of time. In particular, note that the 5% to 10% barium oxide containing catalysts and the 1½% lithium oxide catalyst had a better 36 hour activity than the control catalyst at the 32 hour test period. From the foregoing it appears that these alkaline earth metal and alkali metal components have a material effect upon increasing catalyst activity and holding or stabilizing such activity over a period of time, as well as reducing undesirable clinker formation in the system whereby a fluidized operation may be carried out with improved results in decomposing a gaseous hydrocarbon-stream to hydrogen and carbon.

zone at decomposition conditions to produce a hydrogen rich stream, contacted particles are withdrawn therefrom and subjected to carbon oxidation in a separate reactivation zone in the presence of air and the catalyst is continuously circulated from zone to zone in the system, the improved method of holding catalyst activity and reducing clinker formation, which comprises, using finely divided catalyst particles of alumina-nickel and barium oxide in said system that are prepared by incorporating a catalytic amount of a nickel compound and a stabilizing amount of barium hydroxide or lithium oxide into an alumina hydrogel slurry, spray drying the slurry mixture in the presence of a hot air stream to provide formed and dried microspherical particles, and then calcining the dried particles in the presence of air to reduce the water content thereof and to provide them with a resulting longer stability.

2. In the production of hydrogen from a normally gaseous hydrocarbon charge stream by a fluidized catalyst processing system wherein the catalyst particles effect a fluidized contacting of the charge stream in a reaction zone at decomposition conditions to produce a hydrogen rich stream, contacted particles are withdrawn therefrom and subjected to carbon oxidation in a separate reactivation zone in the presence of air and the catalyst is continuously circulated from zone to zone in the system, the improved method of holding catalyst activity and reducing clinker formation, which comprises using finely divided catalyst particles of alumina-nickel and barium oxide in said system that are prepared by incorporating a nickel compound into an alumina hydrogel slurry stream and barium hydroxide into such stream in amounts providing from about 5% to about 15% nickel and from about 1% to 15% barium oxide by weight of the finished composite, spray drying such slurry mixture in the presence of a hot air stream to provide formed microspherical particles and then calcining the particles in the presence of air at a temperature above 1000° F. for a period of time effective to reduce water content thereof and provide a resulting calcined catalyst with high activity and longer stability.

3. In the production of hydrogen from a normally gaseous hydrocarbon charge stream by a fluidized catalyst processing system wherein the catalyst particles effect a fluidized contacting of the charge stream in a reaction zone at decomposition conditions to produce a hydrogen rich stream, contacted particles are withdrawn therefrom and subjected to carbon oxidation in a separate reactivation zone in the presence of air and the catalyst is continuously circulated from zone to zone in the system, the improved method of holding catalyst activity and reducing clinker formation, which comprises using finely divided catalyst particles of alumina-nickel and lithium oxide in said system that are prepared by incorporating a nickel compound into an alumina hydrogel slurry stream and lithium hydroxide into such stream in amounts

TABLE I

| Ex. No. | Catalyst Composition | Activity | | Clinker Formation (Weight in Milligrams) | |
|---|---|---|---|---|---|
| | | Percent CH₄ Conversion at 32 Hrs. | Percent CH₄ Conversion at 36 Hrs. | Cat. Oxid. at 1,350° F. | Cat. Oxid. at 2,200° F. |
| I | 7% Nickel in Al₂O₃ Slurry | 80.7 | | 290 | 182.6 |
| II | 7% Nickel plus 2% BaO in Al₂O₃ Slurry | 79.4 | | (¹) | (²) |
| III | 7% Nickel plus 5% BaO in Al₂O₃ Slurry | 90.3 | 85.8 | (¹) | (¹) |
| IV | 5% BaO with Al₂O₃ plus 7% Nickel impregnated on Base | 92.6 | 84.9 | 10.0 | 1.0 |
| V | 7% Nickel plus 10% BaO in Al₂O₃ Slurry | 87.6 | 84.5 | 32.0 | 16.9 |
| VI | 7% Nickel plus 1½% LiO in Al₂O₃ Slurry | 88.4 | 85.8 | 19.0 | (²) |
| VII | 7% Nickel plus 3% LiO in Al₂O₃ Slurry | 80.8 | | 42.7 | (¹) |

¹ None.
² Not run.

I claim as my invention:

1. In the production of hydrogen from a normally gaseous hydrocarbon charge steam by a fluidized catalyst processing system wherein the catalyst particles effect a fluidized contacting of the charge stream in a reaction providing from about 5% to about 15% nickel and from about 1% to 15% lithium oxide by weight of the finished composite, spray drying such slurry mixture in the presence of a hot air stream to provide formed microspherical particles and then calcining the particles in the presence of air at a temperature above 1000° F. for a period of time effective to reduce water content thereof and provide a resulting calcined catalyst with high activity and longer stability.

4. A method for preparing an improved and stable finely divided catalyst for the fluidized decomposition of gaseous hydrocarbons to produce hydrogen, which comprises, preparing an alumina hydrogel slurry stream for the spray drying of finely divided particles, mixing with said slurry stream a catalytic amount of a nickel compound and a stabilizing amount of at least one additive component selected from the group consisting of barium, lithium and mixture thereof, spray drying the mixture to give resulting formed microspherical composite particles, and then calcining such particles at an elevated temperature and in the presence of air to provide the desired catalyst particles of improved stability.

5. A method for preparing an improved and stable finely divided catalyst for the fluidized decomposition of gaseous hydrocarbons to produce hydrogen which comprises, preparing an alumina hydrogel slurry stream for the spray drying of finely divided particles, mixing with said slurry stream a nickel compound and barium hydroxide in amounts providing from about 5% to about 15% of nickel and from about 1% to about 15% of barium oxide, by weight of the finished catalyst composite, effecting the spray drying of the slurry mixture in the presence of a hot air stream to provide formed microspherical particles and then calcining such particles at an elevated temperature above 1000° F. and in the presence of air to provide resulting particles of high activity and improved stability and resistance to nickel migration when effecting the fluidized contacting of a hydrocarbon stream at decomposition conditions.

6. A method for preparing an improved and stable finely divided catalyst for the fluidization decomposition of gaseous hydrocarbons to produce hydrogen, which comprises preparing an alumina hydrogel slurry stream for the spray drying of finely divided particles, mixing with said slurry stream a nickel compound and lithium hydroxide in amounts providing from about 5% to about 15% of nickel and from about 1% to about 15% of lithium oxide, by weight of the finished catalyst composite, effecting the spray drying of the slurry mixture in the presence of a hot air stream to provide formed microspherical particles and then calcining such particles at an elevated temperature above about 1000° F. and in the presence of air to provide resulting particles of high activity and improved stability and resistance to nickel migration when effecting the fluidized contacting of a hydrocarbon stream at decomposition conditions.

7. A method for preparing an improved and stable finely divided catalyst for the fluidized decomposition of gaseous hydrocarbons to produce hydrogen, which comprises preparing an alumina hydrogel by the precipitation of alumina from aluminum chloride with ammonium hydroxide, washing and filtering the alumina precipitate to reduce the chloride content to a level below about 0.7%, by weight of the finished catalyst, preparing an alumina hydrogel slurry stream from such washed precipitated alumina for the spray drying of finely divided particles, mixing with said slurry stream a nickel compound and barium hydroxide in amounts providing from about 5% to about 15% of nickel and from about 1% to about 15% of barium oxide, by weight of the finished catalyst composite effecting the spray drying of the slurry mixture in the presence of a hot air stream to provide formed microspherical particles and then calcining such particles at an elevated temperature in the range of 1200° F. to 1600° F. for at least about a two hour period to thereby provide a catalyst with improved stability and resistance to disassociation of nickel therefrom in effecting the fluidized contacting of hydrocarbon stream for hydrogen production.

8. A method for preparing an improved and stable finely divided catalyst for the fluidized decomposition of gaseous hydrocarbons to produce hydrogen which comprises preparing an alumina hydrogel by the precipitation of alumina from aluminum chloride with ammonium hydroxide, washing and filtering the alumina precipitate to reduce the chloride content to a level below about 0.7% by weight of the finished catalyst, preparing an alumina hydrogel slurry stream from such washed precipitated alumina for the spray drying of finely divided particles, mixing with said slurry stream a nickel compound and lithium hydroxide in amounts providing from about 5% to about 15% of nickel and from about 1% to about 15% of lithium oxide by weight of the finished catalyst composite, effecting the spray drying of the slurry mixture in the presence of a hot air stream to provide formed microspherical particles and then calcining such particles at an elevated temperature in the range of 1200° F. to 1600° F. for at least about a two hour period to thereby provide a catalyst with improved stability and resistance to disassociation of nickel therefrom in effecting the fluidized contacting of a hydrocarbon stream for hydrogen production.

References Cited

UNITED STATES PATENTS

| | | | |
|---|---|---|---|
| 2,449,295 | 9/1948 | Gutzeit | 252—466 |
| 2,513,022 | 6/1950 | Helmers et al. | 23—212 X |
| 2,783,133 | 2/1957 | Eastwood | 23—212 |
| 2,898,308 | 8/1959 | Teter et al. | 252—466 X |
| 2,943,065 | 6/1960 | Braithwaite | 252—466 X |
| 2,982,793 | 5/1961 | Turner et al. | 252—466 X |
| 3,014,787 | 12/1961 | Peet | 23—212 X |
| 3,120,495 | 2/1964 | Innes | 252—466 X |
| 3,126,426 | 3/1964 | Turnquest et al. | 252—466 X |
| 3,129,060 | 4/1964 | Pohlenz | 23—212 |
| 3,179,488 | 4/1965 | Appell | 252—466 X |
| 3,186,957 | 6/1965 | Stiles | 252—466 |
| 3,188,174 | 6/1965 | Kehl et al. | 252—466 X |
| 3,256,207 | 6/1966 | Arnold | 23—212 X |
| 3,271,325 | 9/1966 | Davies | 252—466 |
| 3,340,011 | 9/1967 | Hoekstra et al. | 23—212 |

FOREIGN PATENTS 969,637    9/1964    Great Britain.

OSCAR R. VERTIZ, *Primary Examiner.*

EDWARD STERN, *Assistant Examiner.*